INVENTORS M. H. CROWELL
E. I. GORDON
BY Wilford L. Wisner
ATTORNEY

United States Patent Office 3,440,476
Patented Apr. 22, 1969

3,440,476

ELECTRON BEAM STORAGE DEVICE EMPLOYING HOLE MULTIPLICATION AND DIFFUSION

Merton H. Crowell, Morristown, and Eugene I. Gordon, Convent Station, N.J., assignors to Bell Telephone Laboratories, Incorporated, Berkeley Heights, N.J., a corporation of New York Filed June 12, 1967, Ser. No. 645,333
Int. Cl. H01j *31/26, 39/12*
U.S. Cl. 315—10 7 Claims

ABSTRACT OF THE DISCLOSURE

Opposite sides of a planar diode array are scanned by a low-energy reading electron beam and a high-energy writing electron beam that creates a plurality of electron-hole pairs in the substrate, a plurality of the holes serving to discharge the nearest diode through a process termed secondary hole diffusion.

Proposed uses for the tube include uses as a scan converter or a camera tube with current gain. Inasmuch as memory can be built into the target by the use of appropriate traps for the holes, for example, use of a heterojunction, the tube can also be used for scan compression and repeat, for random access memories, and for study of physical processes in silicon.

*Background of the invention*

This invention relates to an electron beam storage device employing semiconductor diode target structures.

In the copending applications of Messrs. T. M. Buck and others and M. H. Crowell and others, Ser. Nos. 605,-715, now Patent No. 3,403,384 and 641,257, filed Dec. 29, 1966 and May 25, 1967, respectively, and assigned to the assignee hereof, television camera tubes are disclosed. These tubes employ a target including planar arrays of reverse-biased silicon p-n junction diodes. A light image is focused upon one side of the array to discharge the diodes; and an electron beam scanned as in a conventional vidicon tube is directed upon the other side of the array to recharge the diodes and simultaneously to read the stored information, that is, to produce output pulses of current sequentially responsive to the image intensity at successively scanned coordinates in the target. The latter-filed application discloses techniques for moderating charge buildup between the diodes, as would otherwise result from the scanning of the electron beam.

In a complete television-telephone type of public common carrier communication system, the transmission bandwidth and therefore the scanning rates differ from the rates that are conventional in a television broadcast system. Moreover, there are aesthetic and technical reasons for desiring different scanning rates at different points in the television-telephone communication system. For example, the faster scanning rates of the broadcast system tend to produce less eyestrain and subjective irritation of a television viewer, while lower scanning rates are more compatible with existing transmission equipment in the communication system, since the image information is more readily transmitted within the available bandwidth of the system. Therefore, it is desirable to provide an electron beam scan converter in such a system.

Moreover, it is well known that temporary information storage can serve a variety of functions in a public common carrier communication system. There is a need both for scan compression and repeat and for random access memory in such a system. Scan compression is the reduction of the time period of each reading scan and typically requires a repeat of information presented in the reading scan without substantial change in the stored information to provide a more continuous output.

In addition, camera tubes as disclosed in the above-cited copending applications could be provided with improved performance if a suitable gain mechanism were available.

*Summary of the invention*

According to our invention, all of these functions can be obtained, in an electron beam storage device employing an array of reverse-biased diodes, by discharging the diodes in response to signal-responsive energetic electrons, whereby each energetic electron will produce a plurality of electron-hole pairs in the semiconductor substrate. We call the holes thus generated "secondary holes" because they result from the bombardment of the substrate by energetic primary electrons. Enough of these holes are generated that, for each energetic electron, a plurality of them will diffuse to the nearest reverse-biased diode junction and participate in partially discharging the junction, thereby storing signal information.

We prefer to call the above-described discharging mechanism "secondary hole diffusion." That mechanism produces substantial current gain that improves the performance of the device. To further facilitate description of the embodiments of our invention, we will refer to the discharging operation as the "writing" operation and the recharging operation as the "reading" operation.

According to one feature of our invention, the sensitivity of a camera tube can be improved by forming a broad beam of energetic electrons emitted from a photoemissive surface in response to the light image directed thereon and electrically focusing the broad beam of energetic electrons upon the semiconductor substrate of the target to write image information therein. The current gain provided by secondary hole diffusion improves sensitivity.

According to another feature of the invention, a scan converter is provided by forming the energetic electrons into a writing beam that is scanned at a rate different from the scanning rate of the reading electron beam. Typically, the energetic writing beam will be modulated by a signal derived from a separate camera tube of any type.

With modifications of the preceding embodiments, in accordance with their principles, scan compression and repeat or random access memory can be provided. In a system in which a scan converter employs scan compression and repeat, the scanning rate of the reading beam in a preceding electron beam tube at the transmitter is illustratively slower than normal in a television system in order to save transmission bandwidth. Then, in order to avoid flicker of the picture at the receiver, the scan of the viewing screen is accomplished at a more conventional rate by the inverse scan conversion to a faster scanning rate. This conversion is scan compression, and involves repeating the display of the same information a plurality of times. The operation of the latter scan converter requires the storing of a charge pattern in a semiconductor diode target at the receiver so that the information will not be destroyed by one "reading" scan. Such charge storage is illustratively provided by the traps for holes inherent in the defects produced by forming a heterojunction on the "writing" surface of the target at the receiver.

*Brief description of the drawing*

Further understanding of our invention and its uses can be obtained from the following detailed description, taken together with the drawing, in which.

*Description of illustrative embodiments*

Figure 1:
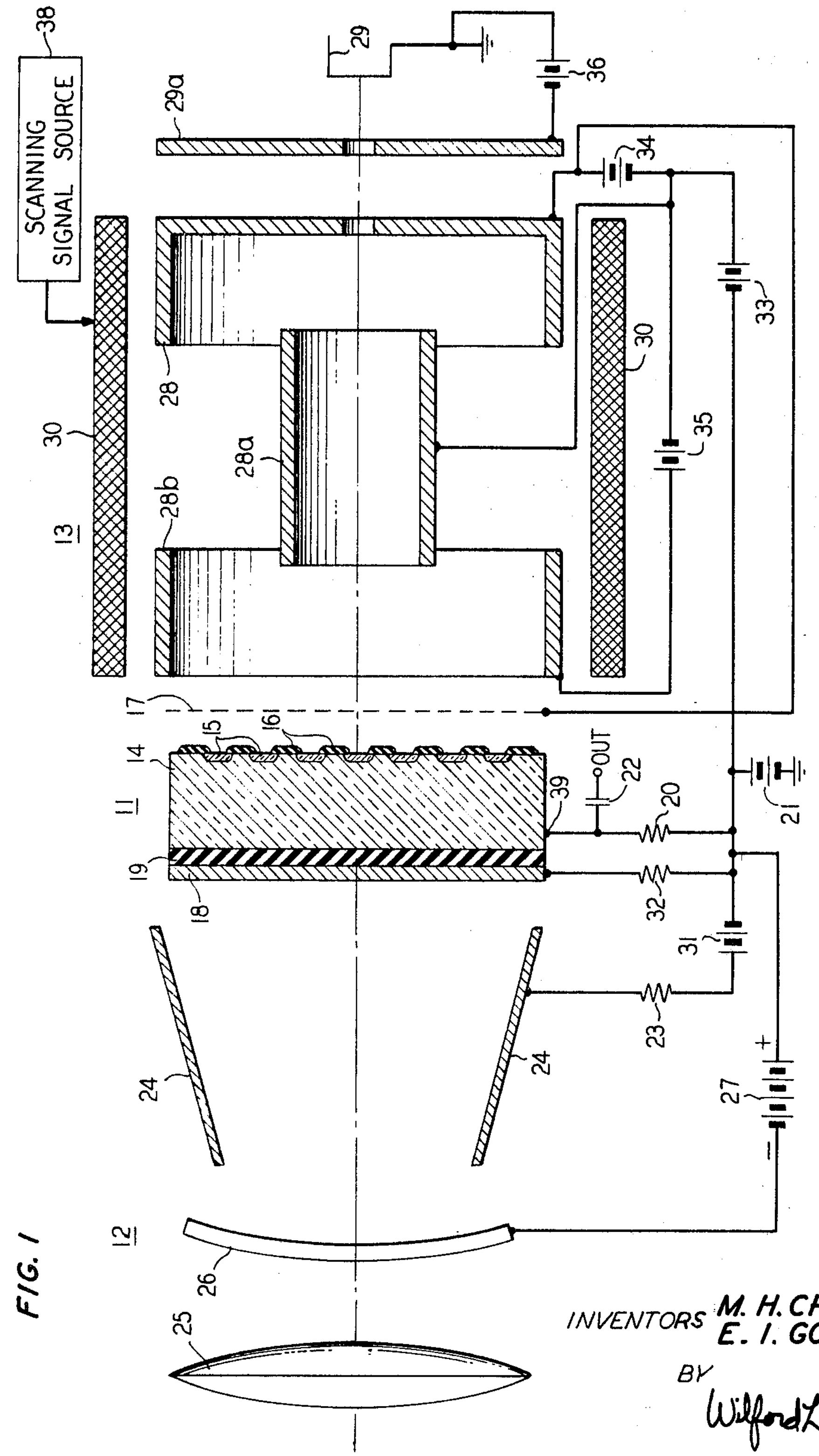
FIG. 1 is a partially pictorial and partially schematic illustration of a first embodiment of the invention employed as a camera tube.

In the illustrative embodiment of FIG. 1, a camera tube with gain is provided by the combination including the target assembly 11, the writing electron beam assembly 12, and the reading electron beam assembly 13. The writing beam assembly 12 produces energetic electrons for the purpose of generating secondary hole diffusion within target assembly 11.

The target assembly 11 comprises a planar array of p-n junction diodes in a silicon crystal the bulk 14 of which is n-type. The p-type regions 15 of the diodes are formed on the reading beam side of the target assembly and provide a plurality of discrete p-n junctions with respect to the common substrate 14. The portions of the substrate 14 extending to the reading beam side of the assembly are covered by the insulating coating 16, which also overlaps the otherwise exposed edges of the junctions, which might otherwise be subjected to discharging by the reading beam or accidental shorting. An additional means (not shown) may be employed to moderate charge buildup upon the insulating coating 16, as disclosed in the above-cited copending patent applications.

The target assembly 11 includes, on the writing beam side, a substantially transparent field-effect electrode 18 which is separated from the substrate 14 by the silicon dioxide insulating layer 19. The combination of layer 19 and electrode 18 serves to inhibit electron-hole recombination in the vicinity of the injection of the energetic electrons. This experimentally-observed inhibiting effect is substantially the same as the effect produced when the electron-hole pairs are created by a light beam and is described in more detail in the above-cited copending patent applications.

The substrate 14 is connected through a suitable low resistance ohmic contact and the load resistance 20 to the positive terminal of a battery 21; and the negative terminal of battery 21 is connected to ground, as is the cathode 29. The field-effect electrode 18 is also connected to a suitable bias point, for example through the resistor 32 to the positive terminal of battery 21.

A secondary electron collector electrode 17 in the form of a grid is provided on the reading beam side of the target assembly 11 in order to collect electrons secondarily emitted from the assembly 11 in response to the reading beam. The electrode 17 is biased positively with respect to the substrate 14 by connection through batteries 34 and 33 to the positive terminal of battery 21.

The writing beam assembly 12 includes a lens 25 which images a light pattern upon the light receiving surface of photoemitter 26. The assembly 12 further includes means for connecting the photoemitter 26 to the negative terminal of high voltage source 27, the positive terminal of which is connected to the positive terminal of battery 21. The voltage of source 27 is illustratively between 5,000 and 25,000 volts, and in any event, is great enough that the average electron entering substrate 14 after penetrating electrode 18 and layer 19 from photoemitter 26 has an energy sufficiently great to provide satisfactory gain. The combination of photoemitter 26 and source 27 is thus adapted for emission of energetic electrons in response to the light image incident upon photoemitter 26.

The writing beam assembly 12 also includes the electron focusing assembly 24 which is connected through a suitable voltage dropping resistor 23 to the positive terminal of battery 31, the negative terminal of which is connected to the positive terminal of battery 21. The function of the electron focusing system 24 is to form the energetic electrons directed toward the target assembly

11 into a pattern that corresponds to the light pattern incident upon photoemitter 26.

The reading beam assembly 13 is substantially conventional and includes an electron gun including the cathode 29, the apertured electrode 29*a*, the accelerating anode 28, the focusing electrode 28*a*, and the collimating electrode 28*b*. Electrode 29*a* is biased negatively with respect to the cathode 29 by the battery 36. The accelerating anode 28 is connected to the positive terminal of battery 34. The focusing electrode 28*a* is connected to the positive terminal of battery 33. The collimating electrode 28*b* is connected to the positive terminal of battery 35; and the negative terminal of battery 35 is connected to the positive terminal of battery 33.

A specific example of the biases with respect to ground in FIG. 1 is a follows:

| Component: | Volts |
|---|---|
| 14 | +5 |
| 18 | +5 |
| 29*a* | −20 |
| 28 and 17 | +300 |
| 28*a* | +67 |
| 28*b* | +100 |
| 24 | +300 |
| 26 | −5,000 to −25,000 |

The reading electron gun assembly is surrounded by the magnetic deflection yoke 30, which is driven by the scanning signal source 38. The reading electron beam can thus be scanned over the surface of target 11 as in other camera tubes.

The fabrication of the target assembly 11 will be described in more detail after the description of the operation of the embodiment of FIG. 1. This operation will now be described.

In operation, the pattern of energetic electrons supplied by the writing beam assembly 12 to the target assembly 11 has the effect of discharging various p-n junctions in the target assembly 11 as follows. The repetitive scan of the reading beam from assembly 13 has maintained, or reestablished periodically, a reverse bias of all the diode junctions by depositing negative charge on the p-type regions 15. Each energetic electron traveling from assembly 12 to assembly 11 and passing through the field-effect electrode 18 and thin insulating layer 19 produces a large number of electron-hole pairs in the silicon substrate 14. The substrate 14, being n-type silicon, supports a dicusion of the minority carrier holes to the space charge regions associated with the p-n junctions at the p-type regions 15 of the reversed-biased diodes. Then, as first disclosed in Patent No. 3,011,089 to F. W. Reynolds, issued Nov. 28, 1961, the holes will be effective upon crossing the junctions to discharge the reverse bias partially. The pattern of discharging is responsive to the pattern of the original light image.

With respect to the specific characteristics of the present invention, it should be noted that the number of hole-electron pairs and so the number of holes produced per energetic electron from assembly 12 is proportional to the energy of that electron. One hole is produced for about every two to four electron volts of energy of the impinging electron. Further, the collection efficiency for holes, that is, their success in diffusing to the space charge regions of the diodes, is a substantial fraction of unity, so that current gains of several hundred may be achieved. Still further, we have found that this operation differs from that of semiconductive particle counters in that the secondarily generated holes tend to diffuse to the nearest ones of a multiplicity of discrete p-n junctions within the continuous array so that the desired pattern of information is preserved.

The output signal is the voltage across load resistor 20 as pulses of current flow therethrough in response to the recharging of the junctions by the reading electron beam from assembly 13. The negative reverse bias of the diodes is reestablished as the image-responsive pulses are passed in scanning sequence to the output of the apparatus through capacitor 22.

For a device designed for sensitivity in the visible and near infrared portion of the spectrum, the target structure 11 is typically made as follows: a slice of monocrystalline n-type silicon, 0.5 to 15 mils thick, is polished to form the substrate 14, then oxidized to form a layer of silicon dioxide in which an array of apertures 8 microns in diameter, 20 microns center-to-center, is etched using conventional photolithographic masking and etching techniques. The layer of silicon dioxide so etched forms the oxide insulating coating 16. Boron is diffused into the exposed areas of the substrate 14 under appropriate diffusion conditions to form the p-type regions 15, with the oxide layer 16 acting as a diffusion mask. Any boron glass or impurity layer that tends to form on the oxide layer is removed with a suitable solvent or etchant. To facilitate making a good ohmic contact 39 to the substrate 14, phosphorus is diffused into the exposed areas of the substrate under appropriate diffusion conditions; and any resulting glass or impurity layer is then removed from the oxide layer 16 with a suitable solvent. In the region not previously doped with boron, the phosphorus makes the material highly n+; and a good contact 39 is easily made to such material by a conventional technique employing a vacuum-evaporated metal (gold, for example). The phosphorus diffusion has been found to improve the bulk properties of the device. The silicon dioxide insulating layer 19 is then formed on the back surface of the substrate 14 to a depth of 0.6 micron in the presence of steam at 950 degrees centigrade or at temperatures as much as several hundred degrees lower. The resulting oxide layer is known as a wet oxide layer and has a beneficial effect in reducing surface recombination of the induced photo electrons and holes at the back surface of substrate 14. The thin gold electrode 18 is then deposited over wet oxide layer 19 on the back surface to a depth of 0.02 micron by vacuum deposition. Optionally, a semi-insulating layer (not shown) of silicon monoxide may be vacuum-deposited on the front surface of the assembly over the insulating coating 16 and the p-regions 15, as disclosed in the above-cited copending patent application of Crowell and others.

It should be noted that the foregoing process is readily adapted to make the substrate of p-type material and the target regions of n-type material. In this case, the reading electron beams remove electrons by secondary emission rather than deposit it. The diodes are thus reverse-biased. Now the secondary electrons generated by the energetic writing electrons effect discharging of the junctions.

The action of the reading beam in such a modified embodiment is described in detail in the above-cited copending application of Buck et al.

The signal-responsive energetic electron beam can also be supplied in a narrow beam that is scanned as well as a broad beam that is focused as in the embodiment of FIG. 1. A suitable arrangement for scanning the energetic electron beam is shown in the illustrative embodiment of FIG. 2.

Figure 2:
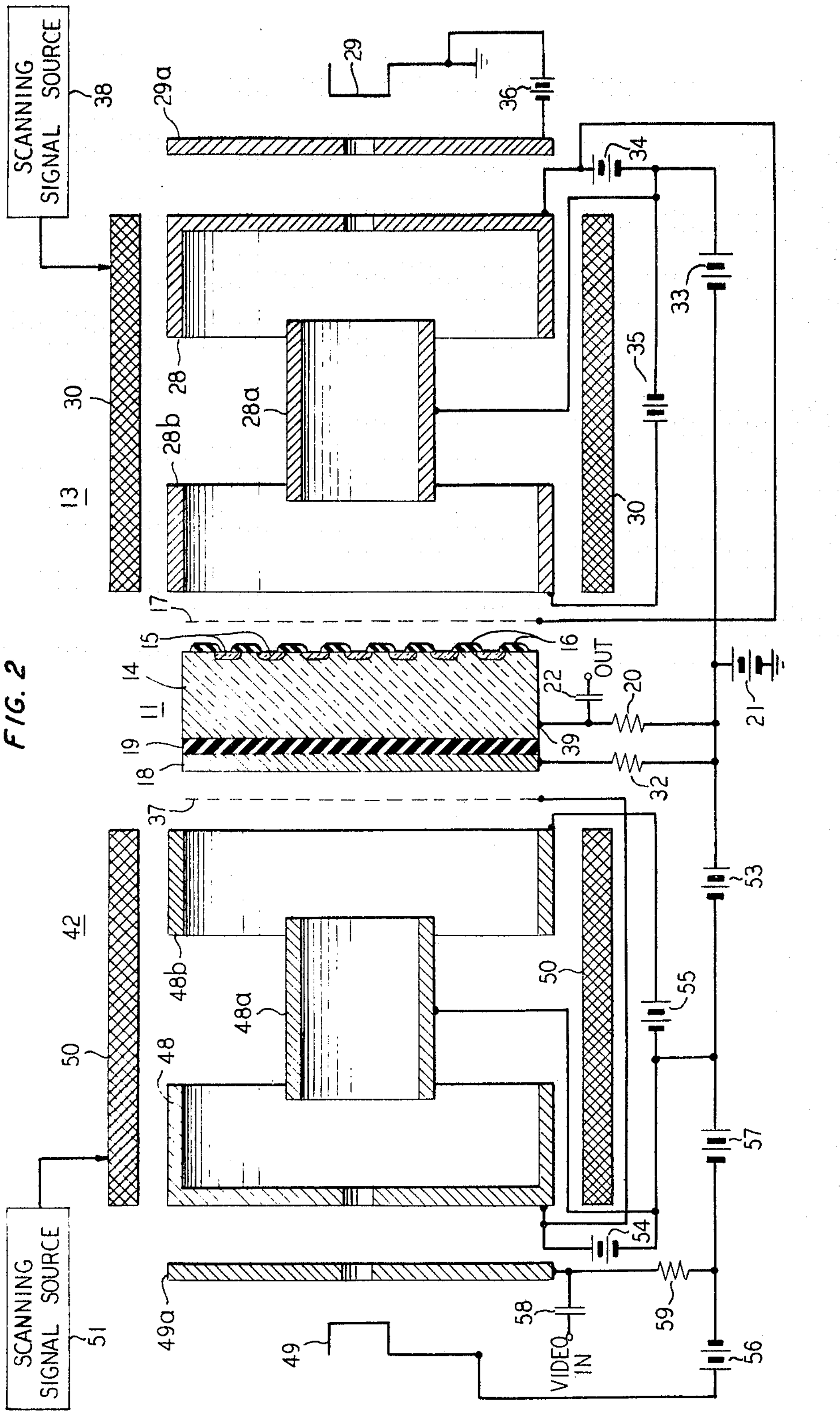
FIG. 2 is a partially pictorial and partially schematic illustration of a second embodiment of the invention employed as a scan converter.

In FIG. 2, all components numbered the same as components of the embodiment of FIG. 1 are substantially identical thereto. The embodiment includes a target assembly 11 like that of FIG. 1 and a reading electron beam assembly 13 like that of FIG. 1. It differs from the embodiment of FIG. 1 in that it includes the writing electron beam assembly 42 which generates and deflects a narrow electron beam and enables the embodiment of FIG. 2 to act as a scanning converter. The writing electron beam assembly 42 includes an electron gun comprising the cathode 49, apertured electrode 49*a*, accelerating anode 48, focusing electrode 48*a* and collimating electrode 48*b*. It also includes the magnetic deflection yoke 50 which is energized from the scanning signal source

51. The image-responsive signal, typically derived from a separate television camera tube, is applied through coupling capacitor 58 to load resistor 59 and to the apertured electrode 49*a*. A secondary electron collector electrode 37 is provided in the assembly 42 in essentially the same manner as electrode 17 in the assembly 13.

A typical set of biases with respect to ground in the assembly 42 of FIG. 2 are as follows:

| Component: | Volts |
|---|---|
| 49 | −2,000 |
| 49*a* | −2,020 |
| 48 and 37 | −1,700 |
| 48*a* | −1,950 |
| 48*b* | −1,900 |

These voltages are established by suitable bias sources 53, 54, 55, 56 and 57.

In operation, the scanning converter of FIG. 2 might typically be employed in a situation in which a high resolution, rapidly scanned picture is to be transmitted as a signal having a lower bandwidth than if the scanning converter was not used. In such a case, the reading electron beam will be scanned at a slower scanning rate than the energetic writing electron beam. Nevertheless, at the receiver, the reverse type of scanning conversion may be desired. In that case, the slowly scanned beam will be the energetic electron beam and the rapidly scanned beam will be the reading electron beam. The latter scanning converter will be described hereinafter with reference to FIG. 3.

The operation of the embodiment of FIG. 2 may be further described as follows. The apertured electrode 49*a* receives from the camera tube through capacitor 58 the amplitude-modulated video signal representative of an image; and the accelerating anode 48 has a relatively high fixed bias of 320 volts with respect to electrode 49*a*. The electrons impinging upon the target assembly 11 and passing through transparent electrode 18 and thin insulating layer 19 will therefore create a large number of electron-hole pairs for each energetic electron, as in the embodiment of FIG. 1. As before, the holes generated by each energetic electron will then tend to diffuse into the p-regions 15 of the nearest diodes and will partially discharge the negative reverse bias previously created by the reading electron beam. With the exception that the image information is now written into the target assembly 11 sequentially or serially, rather than in parallel as in the embodiment of FIG. 1, the operation of the embodiment of FIG. 2 is in other respects substantially like that of FIG. 1.

In some applications, it is desirable to pulse the voltage applied to field-effect electrode 18 with either a large negative or large positive voltage (100 volts) with respect to its average value. The pulse source could be connected serially with resistor 32 between battery 21 and electrode 18. We have found this mode of operation produces the effect of an electronic shutter. Apparently, such voltages either promote electron-hole recombination near oxide layer 19 or else they otherwise inhibit the diffusion of holes to the diode junctions. The rate and duration of shutter pulses depends on the effect desired. For example, it may be desired not to change the writen information until the slower reading scan is complete.

When it is desired to reconvert from a slow scanning rate to a fast scanning rate, it is necessary to modify the target assembly so that the readout will not be completely destructive of the pattern stored. Thus, in the embodiment of FIG. 3, the target assembly 11 of the preceding embodiments is replaced by the modified target assembly 61 which has the n-type substrate 64 and localized surface p-regions 65, similar to those disclosed above, but also has, in place of the field-effect electrode 18 and the insulating layer 19 a heterojunction formed by the epitaxial deposition of a layer 68 of n-type germanium upon the back side of the n-type silicon substrate 64. The energetic electron writing beam assembly 92 is substantially similar to assembly 42 of FIG. 2 except for its slower scanning rate and the fact that its intensity modulation signal is supplied through the transmission medium rather than directly from a camera tube.

The reading electron beam assembly 63 is substantially similar to the assembly 13 of FIG. 2, except for its relatively faster scanning rate.

The fabrication of the target assembly 61 is like that of the target assembly 11 of FIGS. 1 and 2 with respect to the formation of the p-n junctions between regions 65 and substrate 64 and the protection of those junctions from charge accumulation on the reading electron beam target surface, e.g., by insulating coating 66. The layer 68 of n-type germanium may be deposited epitaxially on the writing electron beam target surface of the substrate 64 by the technique described by J. P. Donnelly and A. G. Milnes in the article, "The Epitaxial Growth of Ge on Si by Solution Growth Techniques," Journal of the Electrochemical Society, 113 297 (March 1966). It should be noted that the use of the word heterojunction to describe the interface of layer 68 and substrate 64 does not necessarily imply opposite conductivity types. Like conductivity types of the different materials are preferred; but opposite types could be used if the energetic electrons are not thereby significantly impeded.

Figure 3:
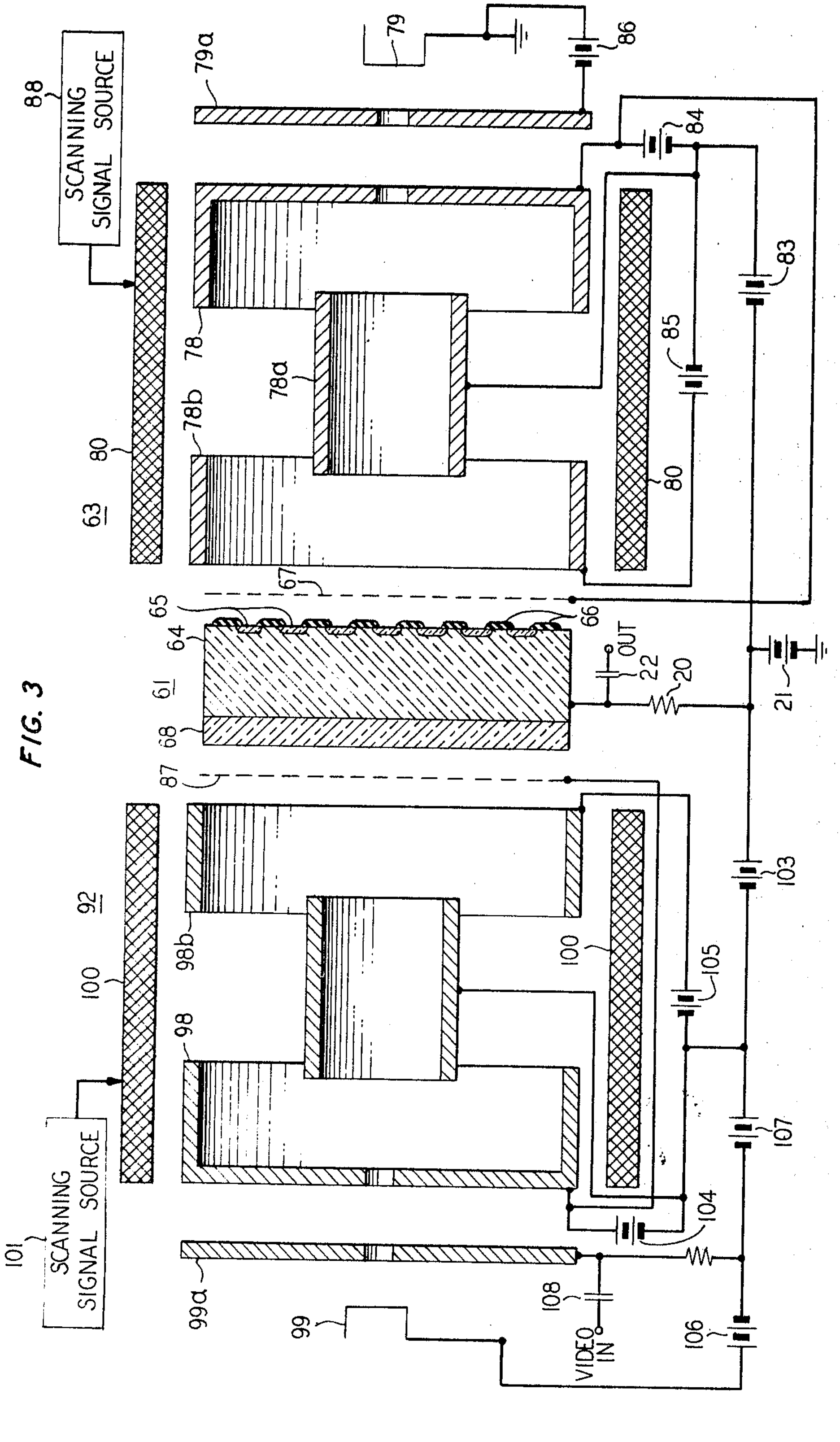
FIG. 3 is a partially pictorial and partially schematic illustration of a third embodiment of the invention employed as another type of scan converter.

In the operation of the embodiment of FIG. 3, the reading electron beam will make several scans for each scan of the writing electron beam. With each scan of the reading electron beam, a set of pulses representing a complete image is passed through the load resistor 20; and the corresponding voltage signal is passed through capacitor 22 to suitable amplifiers and a suitable display tube. As has been described heretofore, the reading electron beam typically recharges each diode junction to its original negative reverse bias. Since no new scan by the energetic writing electron beam is imminent, the information would be completely unavailable for succeeding scans of the reading electron beam unless some additional storage mechanism were provided within the target assembly 61.

Such a storage mechanism for the holes produced by the energetic electrons is provided by lattice defects in the vicinity of the heterojunction between substrate 64 and germanium layer 68. These defects, which are inherent in the process of forming the heterojunction, trap the holes in the vicinity of the junction for an average time of about one second, until the holes are dislodged by sufficient thermal excitation. In any event, the holes should be trapped for a period as long as the period of scanning of the energetic electron beam. Some of the holes will be dislodged earlier than others so that there is a continuing diffusion of them toward the space charge region of the nearest diodes throughout the one-second interval. This continuing diffusion is continuously representative of the image information, in that it is greatest at the points where the more energetic electrons originally impinged. Thus, with no renewed scan by the writing electron beam, the diffusing holes continue to discharge the diode junctions to differing degrees and in a pattern that is representative of the original image information. This charge pattern can be repetitively read out by the reading electron beam as series of pulses through load resistor 20. Each series will be a complete representation of the same complete image. Thus, flicker on the viewing screen will be avoided.

The image on the viewing screen will change as each new scan of the energetic writing electron beam is accomplished.

The operation of the embodiment of FIG. 3, as just described, is characterized as scan compression and repeat.

By employing the principles of the embodiment of FIG. 3, a random access memory may be easily constructed. For random readout, it is merely necessary that one have an appropriate source 88 of address signals to apply to magnetic deflection yoke 80, instead of the television type scanning signal employed in the embodiment of FIG. 3. Information could also be written into the memory on a random basis by application of appropriate deflection signals from source 101 to the magnetic deflection yoke 100 controlling the energetic electron beam. The storage time of one second would be adequate for many types of temporary information stores. Examples are the types for which delay-line memories are presently used.

Various other modifications are within the spirit and scope of the above-described principles of our invention.

What is claimed is:

1. In an electron beam storage device, the combination comprising

- a target structure comprising a semiconductive wafer including a plurality of p-n junctions localized near a first surface of the wafer,
- means for reverse-biasing the p-n junctions comprising means for scanning said first surface with an electron beam,
- means for producing an output current from the reverse-biasing charging of the p-n junctions by said electron beam, and
- means for partially discharging reverse bias of the p-n junctions, comprising means for directing electrons responsive to information into said semiconductive wafer with sufficient energy to create a plurality of electron-hole-pair charge carriers with each information-responsive electron, said reverse bias enabling a plurality of the minority carriers among said plurality of electron-hole-pair charge carriers to diffuse to the nearest p-n junction.

2. The combination according to claim 1, in which the means for partially discharging the reverse bias of the p-n junctions comprises

- a photoemitter,
- means for directing a light image on said photoemitter,
- means for biasing said photoemitter to promote the emission of electrons with energies sufficient to produce for each energetic electron a plurality of charge carriers that are effective in discharging said reverse-bias, and
- means for focusing said electrons into a pattern corresponding to said light image.

3. The combination according to claim 1 in which the means for partially discharging the reverse bias of the p-n junctions comprises

- means for scanning the surface of said wafer opposite said first surface with a second electron beam,
- means for modulating said second electron beam with an information-responsive signal, and
- means for accelerating said electrons to energies sufficient to produce for each energetic electron a plurality of charge carriers that are effective in discharging said reverse bias.

4. The combination according to claim 3 in which the means for periodically scanning the first surface of the wafer and the means for scanning its oposite surface are mutually adapted to be capable of first and second different scanning rates respectively, whereby scan conversion can be accomplished.

5. The combination according to claim 4 in which the means for periodically scanning the first surface and the means for scanning the opposite surface are mutually adapted to make the first scanning rate greater than the second, whereby scan compression is achieved, and the wafer includes in the vicinity of the second surface means for trapping holes for a time as long as the period of the second scanning rate, whereby the repeated scanning of the first surface is effective to repeat the readout of stored information.

6. The combination according to claim 1 in which the wafer includes a semiconductive layer forming a heterojunction in the vicinity of the surface opposite the first surface, said heterojunction having defects effective to trap hole charge carriers.

7. The combination according to claim 1 in which the means for partially discharging the reverse bias of the p-n junctions comprises a photoemitter, a lens adapted to focus a light image on said photoemitter, means for biasing said photoemitter with a negative voltage in the range between five kilovolts and twenty-five kilovolts, and an electron beam focusing assembly adapted to focus said emitter electrons into a pattern on said wafer, said pattern corresponding to said light image.

References Cited

UNITED STATES PATENTS

| | | | |
|---|---|---|---|
| 2,858,246 | 10/1958 | Pearson | 313—66 X |
| 3,094,644 | 6/1963 | Buckbee et al. | 315—12 |
| 3,252,030 | 5/1966 | Cawein | 313—66 |
| 3,322,955 | 5/1967 | Desvignes | 313—66 X |
| 3,341,857 | 9/1967 | Kabell. | |

RODNEY D. BENNETT, Jr., *Primary Examiner.*

JEFFREY P. MORRIS, *Assistant Examiner.*

U.S. Cl. X.R.

250—211; 313—66